Oct. 4, 1932.   F. C. SANDSTROM   1,880,495
SPEED INDICATOR
Filed July 8, 1931
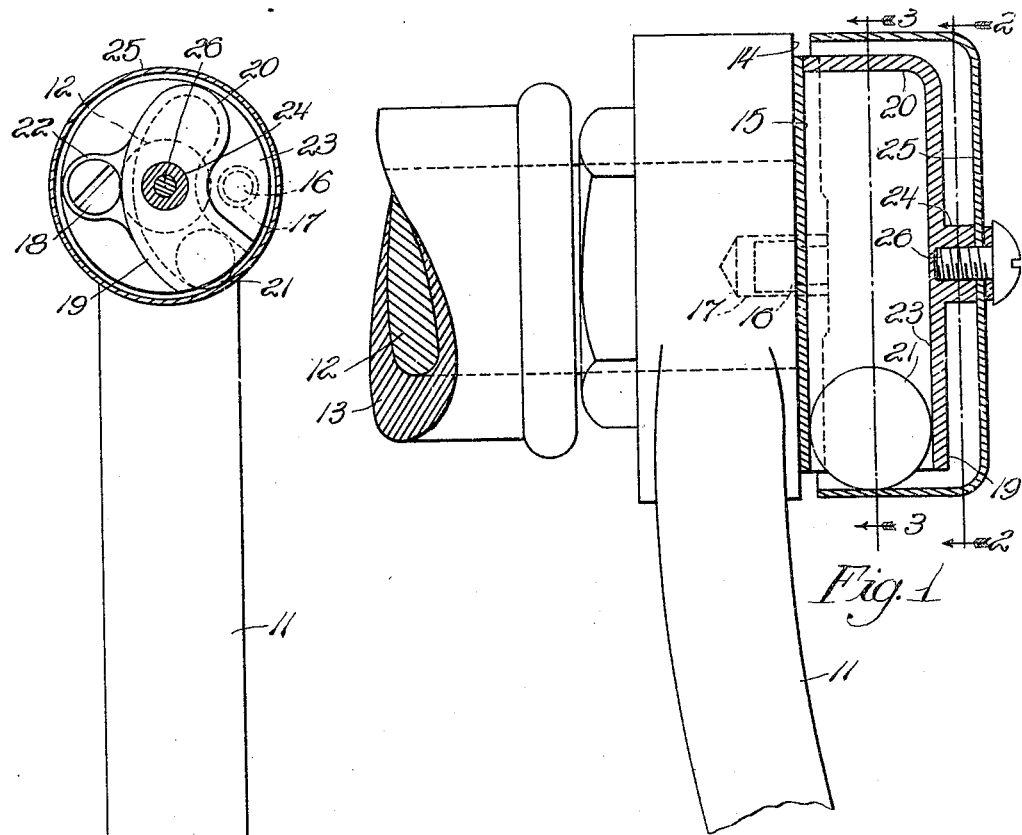
Fig. 1
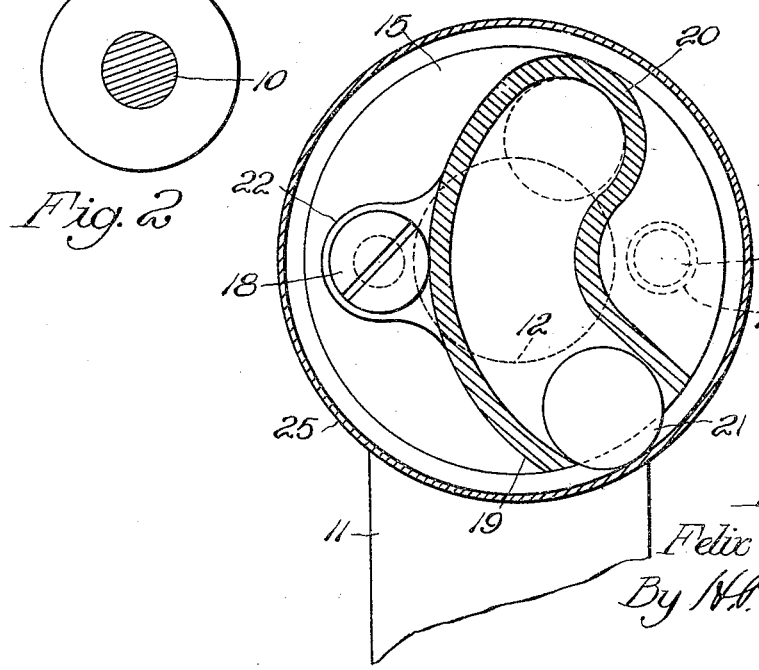
Fig. 2
Fig. 3
Inventor
Felix C. Sandstrom
By N. P. Doolittle
Atty.

Patented Oct. 4, 1932

1,880,495

UNITED STATES PATENT OFFICE

FELIX C. SANDSTROM, OF MILWAUKEE, WISCONSIN, ASSIGNOR TO INTERNATIONAL HARVESTER COMPANY, A CORPORATION OF NEW JERSEY

SPEED INDICATOR

Application filed July 8, 1931. Serial No. 549,394.

The invention relates to an improved audible speed indicator for cream separators.

Such indicators are employed in connection with hand driven cream separators and make an audible sound indication once for each revolution of the crank handle used to operate the cream separator, such sound indication automatically ceasing when the proper speed has been attained. Therefore, these devices usually comprise a bell and a clapper, the latter being actuated by gravity to strike the bell once for each revolution of the hand crank during underspeed, and, when proper speed has been reached, centrifugal force comes into play to hold the clapper so that it cannot strike the bell. In the present invention the clapper takes the form of a free ball.

The object of the invention is to provide a simplified, efficient, bell indicator of the above type, the same to embody a passage-way curved across the center of the bell face so that the ball, when moving from one peripheral point of the bell edge to another peripheral point of the bell edge, must cross the center point of the bell, thereby getting the benefit of a maximum distance and force from center to edge that causes the ball clapper sharply to strike the bell. Thus, the ball passage-way constitutes the arc of a circle disposed eccentrically to the circle of the bell, said arc passing through the center or radial point of the bell circle.

In the accompanying sheet of drawing illustrating the invention,—

Figure 1 is a general vertical view, partly in section, showing the improved indicator mounted on the hand crank of a cream separator, coaxially of its handle roller;

Figure 2 is a sectional view showing the entire length of the crank and the indicator in section, as seen along the line 2—2 of Figure 1, looking in the direction of the arrows; and, Figure 3 is a similar sectional view, as seen along the line 3—3 appearing in Figure 1, when viewed in the indicated direction.

For purposes of illustration, a cream separator drive shaft is generally shown at 10, the same having connected thereto in the conventional manner, a crank 11. The end of the crank 11 remote from the shaft 10 is formed with a bore fixedly to receive a laterally extended handle shaft 12 which is surrounded by the usual hand hold, loose roller 13. By grasping the handle roller 13, the user may operate the crank 11 to rotate the shaft 10 from which mechanism is operated that serves centrifugally to separate milk. If the speed of operation is too slow, inefficient milk separation results. Therefore, the indicator of this invention, now to be described, is provided, so that the operator will definitely know when underspeeds occur; whereupon he will turn the crank faster to overcome the objectionable and inefficient low speed.

It will be noted that the face 14 of the crank 11 is flat and covered by a circular plate 15, which, adjacent one edge, is provided with a pin 16 that fits into a hole 17 formed in the crank face 14. At substantially a diametrically opposed point, the disk plate 15 is secured to the face 14 by a screw 18. Resting against this disk plate 15 is an arcuately shaped, or curved, tunnel-like guide or passage-way member 19 closed at one end as at 20 and open at its opposite end, as shown. This member houses a free ball clapper 21, which rolls on the surface of plate 15 and, because of the curvature of the guide member 19, is constrained to move or roll across the radial center of the plate 15. The plate 15 has an integrally formed ear 22 formed with an aperture, so that, in an obvious manner, the screw 18 may be used to secure the member 19 and plate 15 simultaneously in place. The curvature of the member 19 in effect approximates the arc of a circle eccentrically disposed relative to the circle of plate 15 and further such arc passes through the radial center of the plate 15. Such center incidentally is also coaxial with the axis of the handle shaft 12.

The tunnel or guide member 19 is closed by a top portion 23, which at its center is integrally formed with an extended boss 24, against which is placed a bell 25 disposed in such a way that it encloses the structure heretofore described. The ball clapper 21 at the open end of passage-way 19 contacts the bell. A screw 26 secures the bell 25 to the boss 24 in the manner shown. The use and mode of operation of the indicator will now be described.

In starting the cream separator, the user grasps the handle 13 and turns the crank 11 thereby. As long as underspeed occurs, the ball 21 travels the passage-way once in each direction, or twice, for one complete revolution of the crank, by the force of gravity. Of course, as one end of the passage 19 is closed, the clapper can only strike the bell and give but one sound indication for each revolution of the crank. Eventually, as the speeds get up, the centrifugal force developed will exceed the force of gravity and the ball 21 will become lodged at one end of the passage-way 19 and will be held there, whereupon no sound indication can be given off, and the user will know that the separator is operating at the proper, efficient speed for effective separation.

By angularly relocating the holes which receive the screw 18 and pin 16, the indicator may have any desired angular set position relative to the crank handle about the axial center point of the indicator which remains the same. The indicator can then be caused to cease clicking at any desired angular velocity and also compensation may be had for varying lengths of crank handles. In this manner the indicator may be adapted for use with different sized cream separators.

From this, it will now be seen that a simple and effective sound indicator has been provided for the purpose specified, which achieves the objects heretofore recited.

It is the intention to cover herein all changes and modifications not departing in material respects from the present disclosure, the scope of the invention being defined in the appended claims.

What is claimed is:

1. The combination with a rotating device including a crank having a handle shaft, of an audible speed indicator therefor comprising a circular plate mounted on an end of said shaft, the center of said plate being coaxially aligned with the axis of said shaft, a member thereon providing a curved passage-way crossing the center of said plate, a free clapper slidably arranged in said passage-way, and a bell surrounding the member and adapted to be struck by the clapper.

2. The combination with a rotating device including a crank having a handle shaft, of an audible speed indicator therefor comprising a circular plate mounted on an end of said shaft, the center of said plate being coaxially aligned with the axis of said shaft, a member thereon providing a curved passage-way crossing the center of said plate, one end of said passage-way being closed, a free clapper slidingly arranged in said passage-way, and a bell surrounding the member and adapted to be struck by the clapper.

3. The combination with a rotating device including a crank having a handle shaft, of an audible speed indicator therefor comprising a circular plate mounted on an end of said shaft, the center of said plate being coaxially aligned with the axis of said shaft, a member thereon providing a curved passage-way crossing the center of said plate, said passage-way being curved in the arc of a circle eccentric to the circle of the plate with the arc crossing the center of said plate, a freely sliding ball actuated by gravity and centrifugal force arranged in said passage-way, and a bell embracing the member and adapted to be struck by the ball to emit sound.

4. The combination with a rotating device including a crank having a handle shaft, of an audible speed indicator therefor comprising a circular plate mounted on an end of said shaft, the center of said plate being coaxially aligned with the axis of said shaft, a member thereon providing a curved passage-way crossing the center of said plate, said passage-way being curved in the arc of a circle eccentric to the circle of the plate with the arc crossing the center of said plate, one end of said passage-way being closed, a freely sliding ball actuated by gravity and centrifugal force arranged in said passage-way, and a bell embracing the member and adapted to be struck by the ball to emit a sound once for each revolution of the rotating device.

5. The combination with a rotating device including a crank having a handle shaft, of an audible speed indicator therefor comprising a circular plate mounted on an end of said shaft, the center of said plate being coaxially aligned with the axis of said shaft, a member thereon providing a curved passage-way crossing the center of said plate, a boss protruding from said member, a bell secured to said boss to embrace the member, and a freely sliding ball actuated by gravity and centrifugal force arranged in said passage-way to strike the bell.

6. The combination with a rotating device including a crank having a handle shaft, of an audible speed indicator therefor comprising a circular plate mounted on an end of said shaft, the center of said plate being coaxially aligned with the axis of said shaft, a member thereon providing a curved passage-way crossing the center of said plate, said passage-way being closed at one end, a boss protruding from said member, a bell secured to said boss to embrace the member, and a freely sliding ball actuated by gravity and centrifugal force arranged in said passage-way to strike the bell once for each revolution of the rotating device.

7. The combination with a rotating device including a crank having a handle shaft, of an audible speed indicator therefor comprising a circular plate mounted on an end of said shaft, the center of said plate being coaxially aligned with the axis of said shaft, a member thereon providing a curved passage-way crossing the center of said plate, an apertured ear protruding from said member and lying flatly against the plate, means passed through the ear and plate to secure said parts to the rotating device, a bell surrounding the member, and a freely sliding ball actuated by gravity and centrifugal force arranged in said passage-way to strike the bell.

8. The combination with a rotating device including a crank having a handle shaft, of an audible speed indicator therefor comprising a circular plate mounted on an end of said shaft, the center of said plate being coaxially aligned with the axis of said shaft, a member thereon providing a curved passage-way crossing the center of said plate, a boss protruding from said member, a bell secured to said boss to embrace the member, a freely sliding ball actuated by gravity and centrifugal force arranged in said passage-way to strike the bell, an apertured ear on the member, and means passed through said ear and plate to secure said plate and member to the rotating device.

9. The combination with a rotating device including a crank having a handle shaft, of an audible speed indicator therefor comprising a circular plate mounted on an end of said shaft, the center of said plate being coaxially aligned with the axis of said shaft, a member thereon providing a curved passage-way crossing the center of said plate, said passage-way being closed at one end, a boss protruding from said member, a bell secured to said boss to embrace the member, a free ball actuated by gravity and centrifugal force arranged in said passage-way to strike the bell once for each revolution of the device during underspeeds, and means for securing the member to the plate and the plate to the rotating device.

In testimony whereof I affix my signature.

FELIX C. SANDSTROM.